Dec. 11, 1962     S. C. W. WILKINSON     3,068,014
COOLING MECHANICAL SEALS
Filed Aug. 20, 1959                          3 Sheets-Sheet 2

Inventor
Samuel C. W. Wilkinson
By Ralph B. Stewart
attorney

Dec. 11, 1962 S. C. W. WILKINSON 3,068,014
COOLING MECHANICAL SEALS
Filed Aug. 20, 1959 3 Sheets-Sheet 3

Inventor
Samuel C. W. Wilkinson
By Ralph B. Stewart
Attorney 2,068,014
Patented Dec. 11, 1962

3,068,014
COOLING MECHANICAL SEALS
Samuel Clifford Walter Wilkinson, Cookham, England, assignor to Crane Packing Limited, Slough, Buckinghamshire, England, a British company
Filed Aug. 20, 1959, Ser. No. 835,036
Claims priority, application Great Britain Aug. 22, 1958
1 Claim. (Cl. 277—68)

This invention is concerned with a way of improving the dissipation of the heat generated by friction at the relatively moving surfaces of shaft seals, for example the seal between the driving shaft of a fluid pump and the pump casing. It has been common practice for some years to arrange for a cooling fluid, usually the fluid being pumped, to be circulated in the region of the seal, usually past the rotating member, to carry away the heat generated. For example it has been proposed to circulate a separate cooling fluid actually within a passage provided in one of the relatively moving members of the seal. Even with such arrangements it has been found that large temperature gradients can arise in the immediate neighbourhood of the rubbing surfaces.

It is generally accepted that a seal relies on a fluid film between the faces in order to give long life without excessive wear, but when a high contact surface temperature occurs this results in rapid destruction of the fluid film and consequent wear may cause such severe damage to the contact faces that subsequent sealing becomes impossible.

According to the invention it is now proposed in a fluid-cooled rotary seal of the kind in which a portion of the fluid which the seal retains is passed over the rotating and stationary seal members, to form the seal member with an extended heat-dissipating surface in contact with the cooling fluid, i.e. to shape that surface over which the fluid passes in a manner such as to give it greater surface area than would be required by purely mechanical considerations. Normally the member in question will be the stationary member, against which the carbon or other seal face on the rotating shaft is resiliently urged.

A more complete understanding of the present invention will be had by reference to the accompanying drawings in which.

Figure 1:
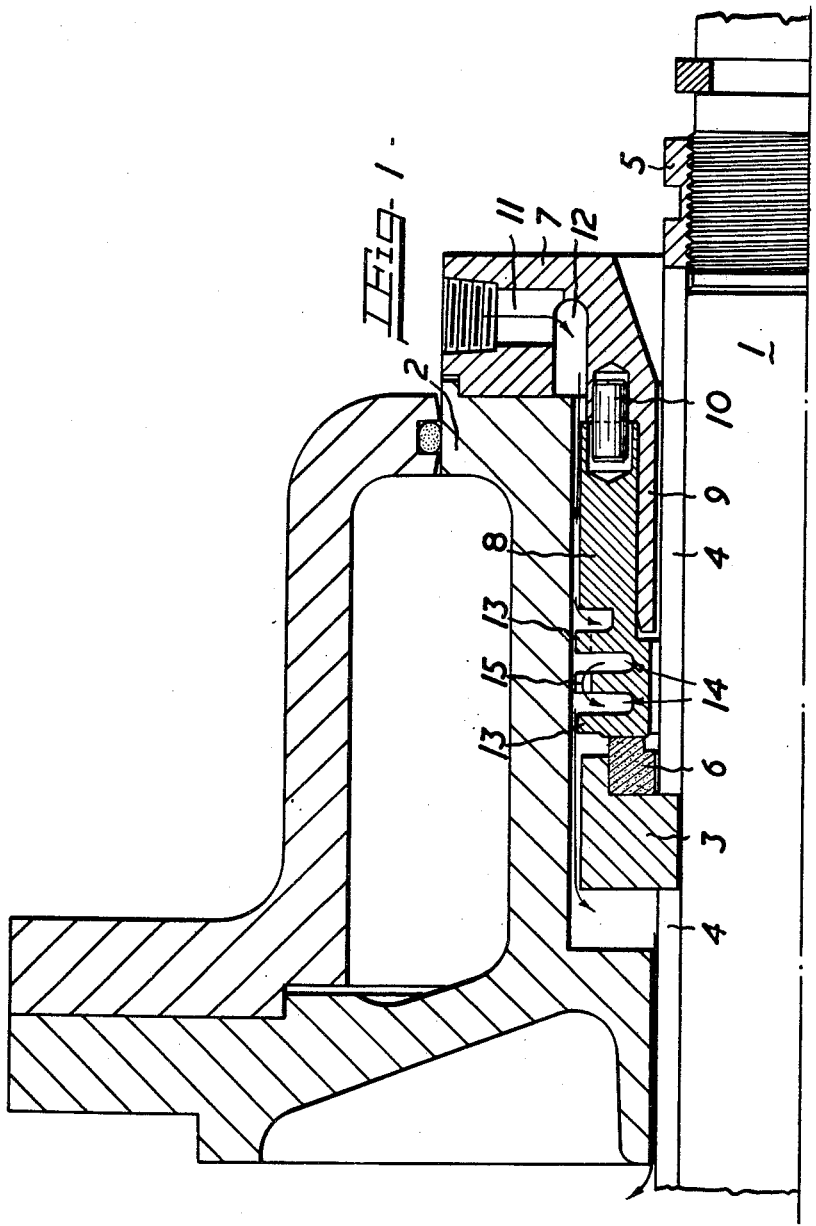
FIG. 1 is a fragmentary axial cross-section illustrating one form of the seal of this invention.

Referring first to FIGURE 1, a shaft 1 mounted for rotation in a housing 2 in which there is a fluid under pressure, e.g. a pump housing carries a seal seat 3, located on the shaft 1 by sleeves 4 and a screwed ring 5. The seat 3 has a working face formed by a ring 6 of carbon or like low-friction material. On the front end of the housing 2 there is mounted a ring 7 carrying the non-rotating part of the seal assembly, which comprises an approximately cylindrical seal member 8 sliding axially on an inward extension of the ring 7. The member 8 is located against rotation by pins 10 engaging in recesses in the member 8 and in the ring 7, and is urged towards the seal face 6 by springs (not shown) spaced around the rear face of the member between the pins 10.

A supply of the fluid within the housing 2, i.e. the fluid being pumped where the housing 2 is that of a pump, but at a higher pressure than that prevailing in the housing, is fed in through a radical or inclined bore 11 in the ring, and passes through a passage 12 into the space between the member 8 and the interior of the housing. It then flows in an axial direction over the non-rotating member 8 and over the rotating parts 3 and 6, abstracting from them the heat generated at their rubbing faces, before passing into the interior of the housing through the clearance around the shaft 1.

In known arrangements of this kind the outer surface of the member 8, i.e. the surface in contact with the fluid, would be smooth, but according to the invention it is provided with a series of fins 13 separated by grooves 14. These are disposed adjacent to that end of the member 8 at which the heat is generated. The peripheral edges of the fins 13 are provided with notches, of which one is visible at 15, to allow flow of the fluid from groove to groove. The surface of the member 8 thus has a substantially greater area than would be provided if it were designed from strictly mechanical considerations, and thus a more efficient transfer of heat to the fluid is obtained, and the mating faces of the members 8 and 6 run at a lower temperature than could otherwise be achieved.

Figure 2:
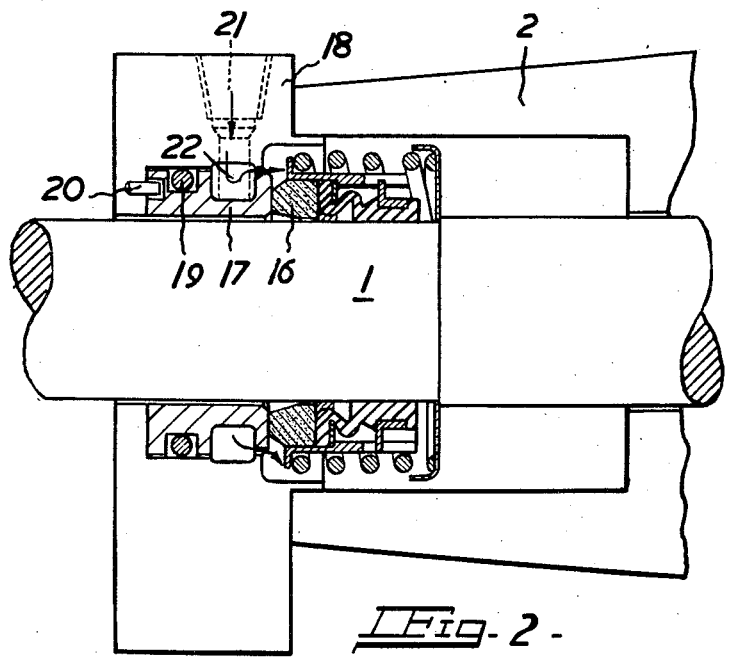
FIG. 2 is a fragmentary axial cross-section illustrating a modified form of the invention.

In the arrangement shown in FIGURE 2 the same reference numerals have been used for the shaft 1 and housing 2. Here, however, the carbon seal face is spring-urged in an axial direction, being shown at 16, and the non-rotating member, shown at 17, is fixed both axially and circumferentially. The seal face 16 and its associated parts are of a known kind and will not be described further. The member 17 is mounted in a ring 18 secured to the end of the housing 2, and is sealed by an O-ring 19, and prevented from rotation by a pin 20. A bore 21 admits fluid tapped off from the circuit of the fluid in the housing 2, and it flows past the members 17 and 16, removing heat from them, and thence back into the housing 2. The surface of the member 17 is provided, immediately behind the rubbing face, with a deep groove 22 which substantially increases the area in contact with the fluid, as compared with a plain cylindrical member.

Figure 3:
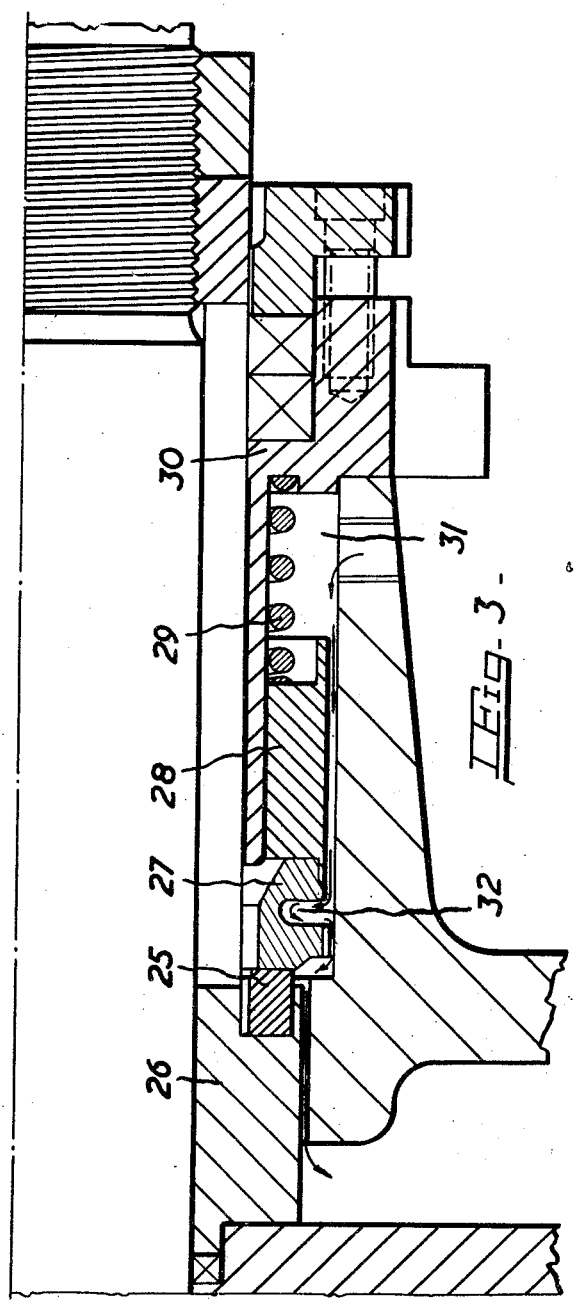
FIG. 3 is a fragmentary axial cross-section illustrating still another form of the invention.

FIGURE 3 shows the invention applied to a rotary seal of the kind in which the carbon face is stationary and the co-operating member rotates. A shaft 24 carries a member 25 mounted in a ring 26 and against this rotating member 25 there is urged a non-rotating carbon seal face 27 mounted on a sleeve 28 and acted on by a spring 29 abutting against a part 30 of the housing. The fluid is admitted to a space 31 by means not shown, and then flows past the sleeve 28, carbon face 27, and member 25 to escape into the interior of the housing. The external surface of the seal face 27 is provided with a deep groove 32 forming an extended surface in contact with the cooling fluid.

Figure 4:
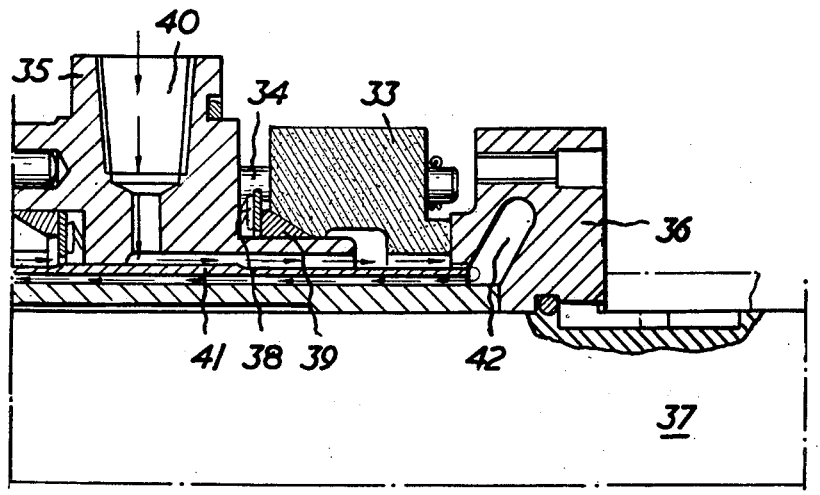
FIG. 4 is a similar view illustrating another alternative embodiment.

FIGURE 4 shows the invention applied to another arrangement with a spring-urged non-rotating carbon face and an axially fixed rotating member, but in this case the fluid is contained inside, instead of outside, the rubbing surfaces. A carbon seal face 33 is axially slidable on pins, of which one is shown at 34, on a fixed ring 35 which forms part of the housing. It is urged towards a metallic mating face 36 on the shaft 37 by springs 38 acting through the medium of a wedge ring 39. Fluid is admitted through a bore 40 and flows along the outside of a thin cylindrical separating wall 41 to the region of the rubbing surfaces, returning along the annular space between the inside of the wall 41 and the outside of the shaft 37. The interior of the member 36 is provided with a deep groove 42 immediately behind the rubbing face, and this substantially increases the area of contact with the fluid, as compared with a member having no such groove.

I claim:

A rotary shaft seal comprising in combination: a shaft, a housing for said shaft, said shaft being mounted for rotation about its axis in said housing, first and second annular seal members embracing said shaft, each of said seal members having a radial face, means urging said members into mutual face-to-face rubbing contact over the said radial faces thereof, said first annular seal member being mounted on said shaft for rotation therewith and said second annular seal member being mounted non-rotatably in said housing, a fluid connection extending radially of said housing and having a passage opening into the interior of said housing in the region of said second annular seal face member, the interior of said housing and the periphery of said first and second annular seal members defining an annular space for passage of cooling fluid admitted through said connection in a generally axial direction over the outside of said members and into said housing, and said non-rotatable second seal member having a cylindrical external surface and a circumferential groove extending radially inwards from said surface, said groove being positioned close to the radial rubbing face on said second seal member to define with said face a thin radial wall portion for presenting an enlarged surface area from which heat may be passed from said faces in rubbing contact to said cooling fluid.

References Cited in the file of this patent

UNITED STATES PATENTS

| | | |
|---|---|---|
| 2,531,079 | Payne | Nov. 21, 1950 |
| 2,824,759 | Tracy | Feb. 25, 1958 |
| 2,886,348 | Porges | May 12, 1959 |

FOREIGN PATENTS

| | | |
|---|---|---|
| 678,981 | Great Britain | Sept. 10, 1952 |